Patented Nov. 17, 1936

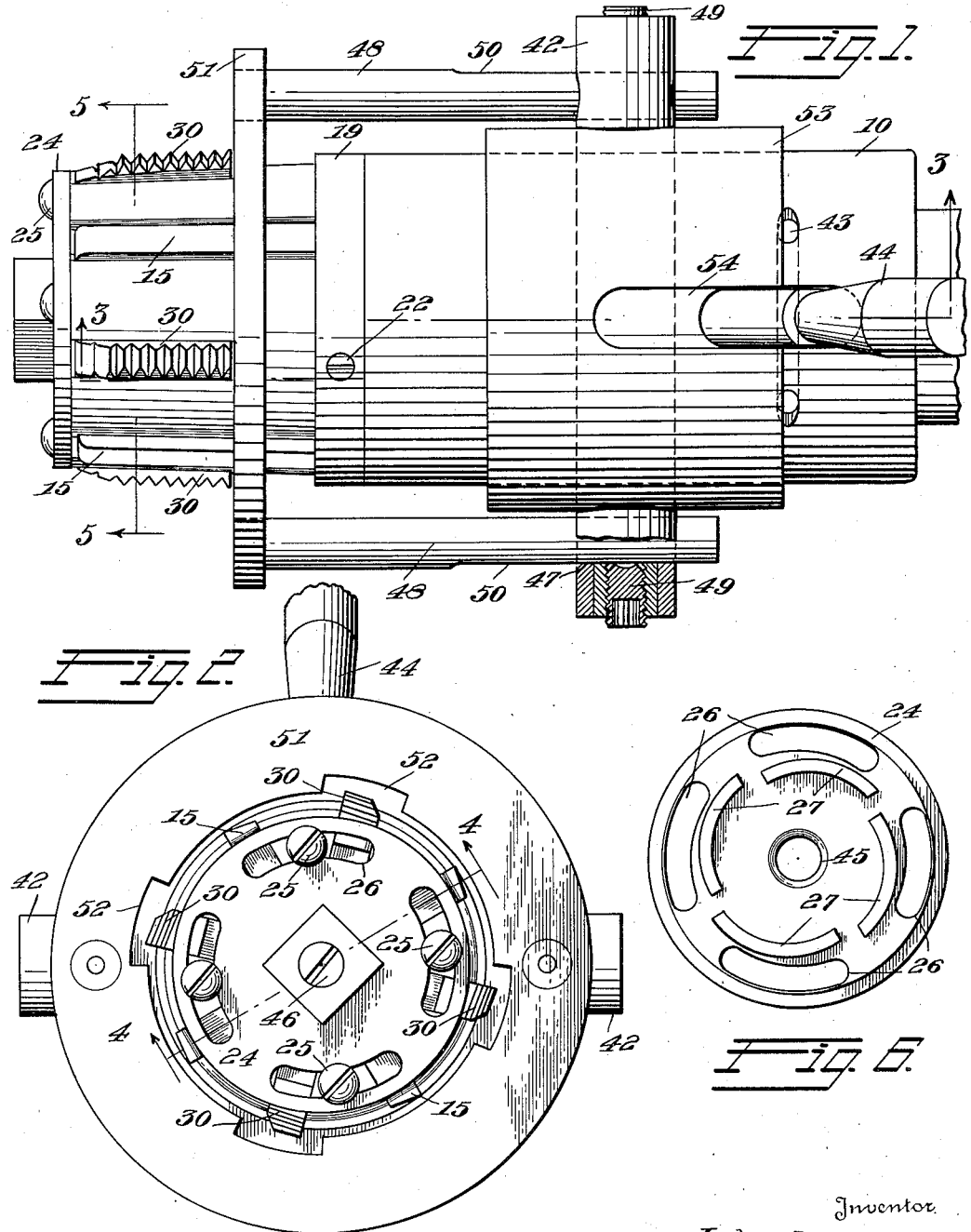

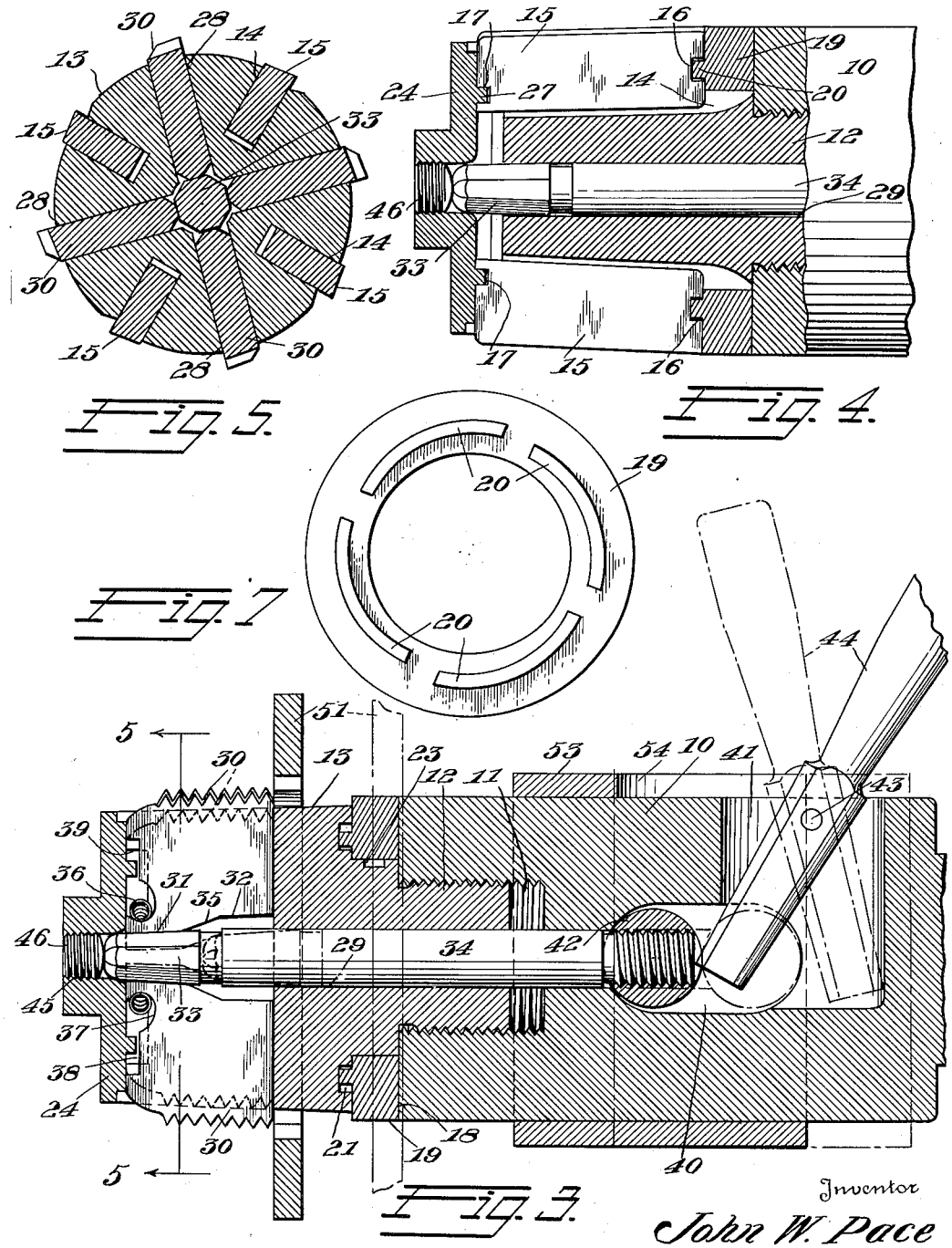

2,060,949

UNITED STATES PATENT OFFICE 2,060,949

COMBINED REAMING AND TAPPING TOOL

John W. Pace, Anniston, Ala., assignor to Alabama Pipe Company, Anniston, Ala., a corporation of Alabama Application January 18, 1936, Serial No. 59,738

6 Claims. (Cl. 10—140)

The present invention relates to a combined reaming and tapping tool.

A primary object of the present invention is the provision of a combined reaming and tapping tool which is durable, simple in construction, and which embodies cooperating adjustable elements for efficiently reaming and tapping in a single operation, in a minimum of time, and with the expenditure of a minimum of effort.

A further object of the invention is the provision of a combined reaming and tapping tool embodying a rotatable body having reaming cutters and tap dies radially mounted therein, the reaming cutters being capable of adjustment radially in the body and the tap dies being supported in the body for manual radial movement to operative position and automatic radial movement to inoperative position.

A still further object of the invention is the provision of a combined reaming and tapping tool comprising a rotatable body having radially adjustable reaming cutters mounted therein and tap dies radially mounted in the body between the reaming cutters and yieldably maintained in engagement with movable means for placing the dies in operative and inoperative position in the body, the movable means cooperating with a lever for manual movement in one direction to place the dies in operative position and the movable means being in connection with other means for engagement with the work for automatically moving the movable means in the opposite direction to place the dies in inoperative position.

With these and incidental objects in view, the invention consists in certain novel features of construction and combination of parts, the essential elements of which are set forth in the appended claims and a preferred form of embodiment of which is hereinafter described with reference to the drawings which accompany and form part of this specification.

Referring to the drawings, wherein like reference characters designate like parts in the several views:

Fig. 1 is a side elevation of the combined threading and reaming tool forming the subject-matter of the present application;

Fig. 2 is an end elevation of the construction illustrated in Fig. 1;

Fig. 3 is a longitudinal section substantially on the line 3—3 of Fig. 1;

Fig. 4 is a partial longitudinal section substantially on the line 4—4 of Fig. 2;

Fig. 5 is a transverse section on the line 5—5 of Fig. 1;

Fig. 6 is an elevational view of the inner face of a reaming cutter adjusting disc; and Fig. 7 is a similar view of a reaming cutter adjusting ring.

Referring to the drawings, 10 designates the shank of the tool which is adapted for suitable operative connection with a lathe or other suitable operating means. The shank 10 at the free end thereof is provided with a threaded recess 11, in which is disposed a screw-threaded extension 12 of the removable head 13.

The head 13 is provided with a plurality of radially disposed longitudinally extending channels 14, which are preferably four in number and which, as indicated in Figs. 4 and 5, have a depth substantially less than the radius of the head and a length equal to the body portion of the head, the inner ends of the channels having the bottoms thereof outwardly curved adjacent the shank 10, as is clearly illustrated in Fig. 4.

Disposed within each of the channels 14 is an adjustable reaming cutter 15, which is provided with a slot 16 in the inner end thereof and a slot 17 in the outer end thereof.

The head 13 adjacent the base of the extension 12 is reduced in diameter to provide with the adjacent end wall of the shank 10 a circumferential channel 18, with which the channels 14 communicate and in which is rotatably mounted an adjusting ring 19, which, as is more clearly indicated in Fig. 7, is provided with cam ribs 20, corresponding in number with the reaming cutters and which, as indicated in Fig. 4, rest in the slots 16 in the adjacent ends of the cutters 15.

The channel 18 intermediate the channels 14 communicates with lateral channels 21 for accommodating the cam ribs. The ring 19 is adapted for rotation in the channel 18 for adjusting the adjacent ends of the cutter 15 through the cooperating slots 16 and cam ribs 20, and the ring is locked in adjusted position by means of a set-screw 22 (Fig. 1) adapted for engagement within a recess 23 in the base of the channel 18.

Engaging the outer end of the head 13 is a disc 24, which is adjustably secured to the head by means of screws 25 (Fig. 2) threaded in the head and extending through circumferentially elongated slots 26 in the disc 24. The disc 24 is provided with cam ribs 27 (Fig. 6) operatively engaged in the slots 17 in the adjacent ends of the cutters 15 for radially adjusting the cutters upon rotation of the disc. The head 13 is further provided with radially disposed channels 28 intermediate the channels 14, which channels 28 are of less length than the channels 14 but which extend radially into communication with an axial bore 29 in the head 13 and shank 10. Movably disposed in each of the channels 28 is a tap die or chaser 30 provided with bases 31 and 32 for alternate seating engagement with a corresponding face on the polygonal expanding head 33 of a rod 34 slidably disposed in the bore 29. The bases 31 and 32 are interconnected by a bevelled portion 35 and the head as well as the bases 31 and 32 are slightly bevelled.

The chasers 30 are maintained in engagement with the head 33 by means of an endless coil spring 36, seated in recesses 37 in the chasers, and the chasers, as well as the end of the head 13, are recessed to accommodate the cam ribs, as is indicated at 38 and 39, respectively, in Fig. 3.

The shank 10 is provided with a diametrically extending and longitudinally elongated slot 40 in communication with a radially disposed recess 41, as is clearly indicated in Fig. 3, the opposite ends of the slot 40 preferably being of arcuate formation for cooperation with a cylindrical pin 42, which projects from opposite sides of the shank 10 and which, centrally of the length thereof, has screw-threaded engagement with the rod 34 for movement therewith longitudinally of the shank 10.

Pivotally mounted in the recess 41, by means of a pin 43, is a handle lever 44 for engagement with the rod 34 to move the same forwardly to the position indicated in Fig. 3, with the bases 31 of the chasers 30 engaging the expanding head 33 and with the chasers in projected or operative position.

Threadedly engaged in a bore 45 axially of the disc 24 is a screw 46 which, upon being removed, admits of slight adjustment of the chasers by turning the rod 34, as by means of a screw driver, which results in the head 33 being moved slightly inwardly or outwardly, due to the threaded connection between the rod 34 and the pin 42.

The pin 42 adjacent each end thereof is provided with a diametrical bore 47, in which is adjustably disposed a rod 48, which is held in adjusted position by means of a screw 49 disposed axially of the pin 42 for locking engagement with a flattened face 50 on the rod 48.

The rods 48 at the forward ends thereof are suitably secured at diametrically opposite points to a ring 51, which defines the extent of the threading operation, as well as means for automatically collapsing the chasers, as is more fully hereinafter described. The ring 51 encircles the head 13 and is provided with slots 52 for accommodating the dies or chasers 30.

In order to hold the pin 42 against turning, relative to the rod 34, and to provide effective guiding means for the fore and aft movement of the pin 42 and associated parts, the shank 10 is encircled by a sleeve 53, through which the pin 42 extends adjacent opposite ends thereof, and the sleeve 53 is provided with an elongated slot 54 for accommodating the lever 44.

It is to be noted that the tap dies or chasers 30 and the reaming cutters 15 are arranged in the removable head 13 between the adjusting rings 19 and 24 and that the reaming cutters 15 are so disposed relative to the tap dies 30 as to ream a hole to a proper tapping size immediately in advance of the tapping operation carried out by the tap dies 30.

The reaming cutters should be so adjusted relative to the tap dies as to project outwardly of the head 13 a distance substantially equal to the projection of the main body portions of the tap dies in order to ream the hole to the proper diameter for most effective tapping by the dies 30. To assure such relation, the reaming cutters 15 can accurately and quickly be adjusted through rotation of the adjusting ring 19 and the adjusting disc 24, which adjustment is carried out as follows.

The set-screw 22 is slacked sufficiently to permit rotation of the ring 19, whereupon the ring is rotated to effect radial movement of the adjacent ends of the cutters 15 through the cooperation of the cam ribs 20 and the slots 16. After having adjusted the cutters 15 to the required extent, the set-screw 22 is turned in to lock the ring 19 in position and thus hold the cutters against radial movement.

The opposite or forward ends of the cutters are adjusted in a like manner upon rotation of the adjusting disc 24, which, through the cooperating cam ribs 27 and slots 17, adjusts the corresponding ends of the cutters 15, the disc 24 being locked in adjusted position by means of the screws 25.

The cutters 15 would probably be most accurately adjusted by loosening the set-screw 22 and the screws 25 and rotating the ring 19 and the disc 24 simultaneously until the cutters have been adjusted to the required extent.

The tap dies 30 may also be adjusted to a small extent by removing the screw 46 and rotating the rod 34 to thereby move the head 33 slightly forwardly or rearwardly of the tool.

In the operation of the combined threading and reaming tool, the shank 10 is operatively connected with a lathe or other suitable operating means. When the tool has been properly positioned relative to the pipe or other object to be operated upon, the operator pulls upon the handle lever 44, which pushes the rod 34 forwardly to the position indicated in Fig. 3, the expanding head 33 of which forces the tap dies 30 radially outward against the action of the spring 36 in position for the tapping operation. The tool is now rotated and fed forwardly, commensurate with the pitch of the thread to be cut, and the reaming cutters 15 will properly ream the interior of the pipe immediately in advance of the tapping operation by the chasers or tap dies 30.

Prior to the tapping and reaming operation, the rods 48 are adjusted in the pin 42 to such an extent as to position the ring 51 in accordance with the extent to which it is desired to thread the interior of the pipe. When, during the threading and reaming operation, the ring 51 engages the end of the pipe, the rod 34 will be retracted and the threads will become of gradually less depth as the head 33 moves rearwardly until the bases 32 of the dies 30 engage the head 33, whereupon the dies will be retracted within the head 13, as indicated in dot and dash lines in Fig. 3, after which the tool can readily be removed without any likelihood of damage to the threads.

The spring 36 always maintains the dies 30 in engagement with the expanding head 33, both in the operative and inoperative position of the dies. While the head 33 is slightly bevelled, it is not of such degree that the pressure of the dies thereon during the tapping operation will force the rod 34 rearwardly, particularly when the tool is operated in a vertical position, as is usually the case.

It will be seen from the foregoing disclosure that a combined reaming and tapping tool is provided which is durable, relatively simple in construction, and which is capable of simultaneously reaming and tapping a hole in an efficient manner and with the expenditure of a minimum of time and effort.

While I have disclosed but a single specific embodiment of my invention, it is to be considered as illustrative and not restrictive, the scope of the invention being defined in the subjoined claims.

What I claim and desire to secure by Letters Patent is:

1. In a combined reaming and tapping tool, an elongated shank, a head removably secured to the shank, a bore axially of said shank and head, radially disposed channels in said head in communication with said bore, tap dies adjustably mounted in said channels, a longitudinally movable rod in said bore, a die expanding head on said rod, spring means yieldably holding said dies in engagement with said expanding head, manually operable means supported on said shank for moving said rod in one direction for adjusting said dies to operative position, work contacting means connected with said rod for moving the same in the opposite direction for adjusting said dies to inoperative position, radially disposed channels in said head between the first-mentioned channels, reaming cutters adjustably mounted in said last channels, rotatable adjusting means adjacent opposite ends of said head, and cooperating cam means on said reaming cutters and said rotatable adjusting means.

2. In a combined reaming and tapping tool, a rotatable head, reaming cutters and tap dies radially supported in the head, means urging the tap dies radially inward to inoperative position, means longitudinally movable in the head for moving the tap dies radially outward to operative position, and rotatable means adjustably supported by the head for radially adjusting the reaming cutters in the head.

3. In a combined reaming and tapping tool, a rotatable body member, tap dies radially disposed in the body member, a longitudinally movable rod axially disposed in the body member, cooperating cam surfaces between the dies and one end of the rod, a transverse slot in the body member, a pin extending through the slot and movable therein, a threaded connection between the opposite end of the rod and the pin for adjustment of the rod longitudinally of the body member, a vertically disposed recess in the body member in communication with the transverse slot, a handle lever pivotally mounted in the recess for moving the pin in the transverse slot, and a sleeve encircling the body member, the sleeve having diametrically opposed apertures for receiving the opposite ends of the pin, and a longitudinally disposed slot opening through one end thereof for receiving the handle lever.

4. In a combined reaming and tapping tool, a rotatable body member, reaming cutters and tap dies radially disposed in the forward end of the body member, a longitudinally movable rod axially disposed in the body member, cooperating cam surfaces between the tap dies and the forward end of the rod for radially expanding the dies upon forward movement of the rod, a transverse pin movable longitudinally of the body member for moving the rod therein, an adjustable connection between the rear end of the rod and the pin for varying the relation between the cam surfaces on the forward end of the rod and the tap dies, an adjusting disk rotatably mounted on the forward end of the body member, cooperating cam means on the disk and the reaming cutters for effecting radial adjustment of the reaming cutters upon rotation of the disk, and an aperture axially of the disk in longitudinal alignment with the rod for effecting the adjustment between the rod and transverse pin.

5. In a combined reaming and tapping tool, a cylindrical shank for connection with actuating means having a threaded recess in one end thereof, a head having a threaded extension removably engaged in said recess, an adjusting ring rotatably mounted on said head adjacent said shank, an adjusting disc rotatably mounted on the free end of said head, adjustable means for locking said ring and said disc against rotation, radially disposed channels in said head, a reaming cutter disposed in each of said channels, and cooperating cam means on said ring, disc, and reaming cutters for effecting radial adjustment of said cutters in said head upon rotative movement of said ring and said disc, radially disposed channels in said head between said first channels, tap dies movably disposed in said last channels, means axially movable in said head for moving said dies to operative position in said head, and yieldable means in said head for urging said dies to inoperative position.

6. In a combined reaming and tapping tool, a rotatable body member, tap dies movably disposed in the body member, a rod longitudinally movable axially of the body member, a die expanding head on the forward end of the rod cooperating with the bases of the tap dies, yieldable means for maintaining the dies in engagement with the expanding head, an elongated slot extending transversely of the body member, a transverse pin movably disposed in the slot, the rear end of the rod being adjustably connected with the pin intermediate the ends thereof, a work engaging ring encircling the body member, and a rod at each side of the body member and having one end thereof secured to the ring and the opposite end thereof adjustably secured to the adjacent end of the pin, a vertically disposed recess in the body member communicating with the slot, and a handle lever pivotally connected with the body member within the recess for engagement of one end thereof with the pin for moving the expanding head forwardly in the rotatable body member.

JOHN W. PACE.